(12) United States Patent
Wang et al.

(10) Patent No.: US 9,526,137 B1
(45) Date of Patent: Dec. 20, 2016

(54) LOW-NOISE CURRENT REGULATION CIRCUITS

(71) Applicant: NXP B.V., Eindhoven (NL)

(72) Inventors: Ge Wang, Chandler, AZ (US); Ling Su, Chandler, AZ (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/754,057

(22) Filed: Jun. 29, 2015

(51) Int. Cl.
*H05B 33/08* (2006.01)
*H02M 3/04* (2006.01)

(52) U.S. Cl.
CPC ........... *H05B 33/0818* (2013.01); *H02M 3/04* (2013.01); *H05B 33/0824* (2013.01)

(58) Field of Classification Search
CPC ............ H05B 33/0818; H05B 33/0824; H05B 33/0815; H02M 3/04
USPC .......................................................... 315/186
See application file for complete search history.

(56) References Cited

U.S. PATENT DOCUMENTS

| | | | | |
|---|---|---|---|---|
| 6,046,646 A * | 4/2000 | Lo | ............... | H03B 1/04 331/10 |
| 6,204,649 B1 * | 3/2001 | Roman | ................... | H02M 1/12 323/282 |
| 7,504,810 B1 | 3/2009 | Tagare | | |
| 8,239,694 B2 * | 8/2012 | Saha | ..................... | H02M 3/156 323/283 |
| 8,278,831 B2 | 10/2012 | Hoogzaad et al. | | |
| 8,723,441 B2 | 5/2014 | Hoogzaad | | |

| | | | | |
|---|---|---|---|---|
| 2007/0132509 A1 * | 6/2007 | Mochizuki | ................ | H03F 1/26 330/10 |
| 2011/0051779 A1 * | 3/2011 | Wu | .......................... | H03K 3/84 375/130 |
| 2015/0076999 A1 | 3/2015 | Malinin et al. | | |

FOREIGN PATENT DOCUMENTS

| | | | |
|---|---|---|---|
| EP | 1 592 154 A2 | 11/2005 | |
| EP | 1 592 154 A3 | 11/2005 | |

OTHER PUBLICATIONS

Extended European Search Report for application 16175035.1 (Nov. 3, 2016).

* cited by examiner

*Primary Examiner* — Dylan White

(57) ABSTRACT

Apparatuses and methods concerning regulation of load currents are disclosed. As an example, one apparatus includes a first clock generation circuit configured to generate a first clock signal with a frequency spectrum having a first frequency range. A second clock generation circuit is configured to produce a second clock signal by spreading the frequency spectrum of the first clock signal to have a second frequency range that is wider than the first frequency range. The second clock signal has a frequency spectrum extending outside of the frequency range. The apparatus includes a third circuit configured to regulate a voltage at a supply node as a function of the second clock signal. A current regulation circuit is configured to regulate current in a circuit path, from the supply node and passing through a load circuit coupled to the current regulator, as a function of the first clock signal.

20 Claims, 6 Drawing Sheets

LOW-NOISE CURRENT REGULATION CIRCUITS

Aspects of various embodiments generally relate to electronic circuits and, more particularly, to electronic circuits used to drive a load, for example, a light emitting diode (LED) load.

The light output of a light emitting diode (LED) is often controlled by regulating a current through the LED using pulse width modulation (PWM). In PWM, the LED is modulated between an on-state and an off-state. When in the on-state, typically the LED is supplied with a constant current. When in the off-state, no current is supplied to the LED. The output flux, that is to say the amount of light output by the LED, is determined by the time-integral of the current. For some LEDs, the wavelength of light emitted by the LED may be dependent on the current. Using PWM, dimming may be controlled without changing the instantaneous current through the LED. As a result, wavelength of the light may be more accurately controlled.

In some applications, multiples LED may be connected together in series to form a string of LEDs that may be collectively driven by a current driver. For instance, strings of series connected light-emitting diodes (LEDs) may form an LED display, or more particularly, a backlight for a liquid crystal display (LCD). For LED strings including a large number of series connected LEDs, a voltage larger than that of a supply voltage (e.g., a battery) may be needed to drive the LED string. In some implementations, a switching regulator (e.g., a boost converter) may be used to generate a regulated voltage that is greater than a supply voltage.

These and other matters have presented challenges to regulation of current for load circuits in a variety of applications.

Various example embodiments are directed to apparatuses and methods for regulating current for one or more load circuits. According to an example embodiment, an apparatus includes a first circuit configured to generate a first clock signal with a frequency spectrum having a first frequency range. A second circuit is configured to generate a second clock signal from the first clock signal by spreading the frequency spectrum of the first clock signal to have a second frequency range that is wider than the first frequency range. The apparatus includes a third circuit configured to couple a power source to a supply node in a first mode of operation, and uncouple the power source from the supply node in a second mode of operation. The third circuit is configured to regulate a voltage at the supply node as a function of the second clock signal by switching between the first and second modes of operation at a plurality of frequencies derived from the frequency spectrum of the second clock signal. A fourth circuit is configured to regulate current in a circuit path, from the supply node and passing through a load circuit coupled to the fourth circuit, according to the first clock signal.

According to another example embodiment, a method is provided for regulating current in one or more load circuits. A first clock signal is generated that has a first frequency spectrum in a first frequency range. A second clock signal is generated from the first clock signal by spreading frequency spectrum of the first clock signal to have a second wider frequency range. A regulated voltage is generated as a function of the second clock signal and provided to a supply node. Current in a circuit path, from the supply node and passing through a load circuit, is regulated as a function of the first clock signal.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which:

FIG. 3 shows a second example circuit for performing frequency spectrum spreading, consistent with one of more embodiments;

Figure 1:
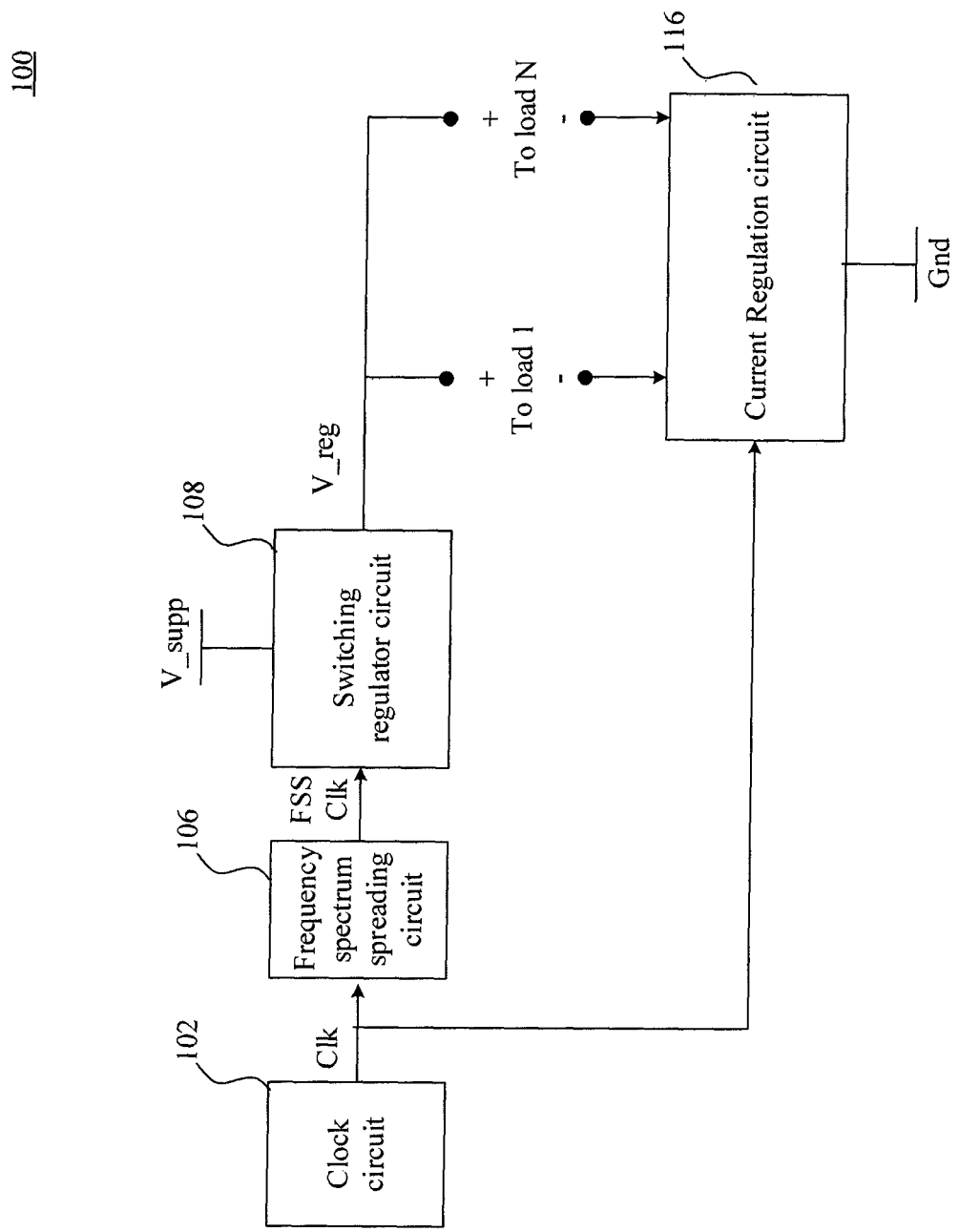
FIG. 1 shows an example load driver circuit, consistent with one of more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving regulation of currents for driving one or more load circuits. In certain implementations, aspects of the present disclosure have been shown to be beneficial when used in the context of applications involving switching regulators. For example, LED drivers often utilize a switching regulator (e.g., a boost converter) to generate higher voltages for driving LED strings.

While not necessarily so limited, various aspects may be appreciated through a discussion of examples using such exemplary contexts.

A switching regulator cycles between operating in a first mode (charging), in which a power source is coupled to an output node, and a second mode (idle), in which the power source is uncoupled from the output node. The switching regulator generally cycles between the first and second modes according to a duty cycle derived from a clock signal. As a result, a large amount of switching noise is introduced in a narrow frequency band centered around the frequency of the clock signal. Switching noise may cause problems for various applications. For example, switching noise may cause electro-magnetic-interference (EMI) exhibited by a device to exceed allowable EMI limits in the narrow frequency band of the switching noise.

Various embodiments use frequency spectrum spreading to reduce the level of switching noise at the clock frequency. Frequency spectrum spreading techniques deliberately shift frequencies of portions of a signal having a particular frequency range (bandwidth) to produce a second signal having a wider frequency range. For ease of reference, frequency spectrum spreading may be referred as spectrum spreading. In one or more embodiments, spectral spreading is performed to reduce concentration of switching noise a certain frequencies. Switching noise may be distributed over a wider frequency range by frequency spectrum spreading a clock signal used by the switching regulator to cause the frequency spectrum of the clock signal to be spread out over a wider frequency range. For example, spectral spreading may shift the frequency of small portions of the clock signal, to cause the frequency of the clock signal to vary by a small amount (e.g., 1%) around a center frequency.

It has been discovered that frequency spectrum spreading of a clock signal may introduce error in the regulation of current used to drive a load. For example, pulse width modulation techniques may drive a current source or current sink using a pulse width modulated signal derived from the clock signal. In some embodiments, a clock generation circuit is configured to provide a low-accuracy clock having a spread frequency spectrum to a switching regulator used to generate a regulated voltage and provide a high-accuracy clock to current regulation circuits used to control a load current. In this manner, switching noise of the switching regulator is reduced without sacrificing accuracy of the current regulation circuits.

According to an example embodiment, an apparatus is provided for regulation of current for one of more load circuits. For ease of reference, the current used to drive a load may be referred to as a load current. The apparatus includes a clock circuit configured to generate a first clock signal having a first frequency spectrum limited to a narrow frequency band. A frequency spectrum spreading circuit (e.g., a spread-spectrum clock generator) is coupled to the clock circuit is configured to spread the frequency spectrum of the first clock signal to produce a second clock signal (e.g., a spread-spectrum clock) with a frequency spectrum having a wider frequency range in comparison to the first clock signal. For example, the frequency spectrum spreading may shift some spectral energy from the narrow frequency band of the first clock signal to adjacent frequency bands. As a result, frequency spectrum in the narrow frequency band is reduced. In some implementations, frequency spectrum spreading may shift portions of the clock signal to other frequencies pseudo randomly. In some other implementations, the frequency spectrum spreading may shift portions of the clock signal to one or more designated frequencies.

The apparatus includes a switching regulator configured to regulate a voltage at a supply node as a function of the second clock signal. For instance, the switching regulator may switch between charging and idle modes of operation according to a duty cycle derived from the second clock signal. As previously described, due to the spread frequency spectrum of the second clock signal, switching noise exhibited by the switching regulator is distributed across a wider frequency band. A current regulation circuit is configured to regulate load current for a load circuit coupled to the supply node, based on the first clock signal. For example, in some implementations, the current regulation circuit may drive a current source or current sink using a pulse width modulated signal derived from the first clock signal. For instance, pulses may have a width that is a multiple of the clock cycles of the first clock. As the frequency spectrum in the first clock is not spread, error is not introduced in the load current regulated by the current regulation circuit. In this manner, switching noise may be distributed in the frequency spectrum without introducing error in the current regulation circuits used to regulate the load current.

Different implementations may perform frequency spectrum spreading using various circuit arrangements. In one example implementation, a frequency spectrum spreading circuit includes a current source configured to generate a current having pseudorandom variation and a capacitor coupled to receive the generated current. The frequency spectrum spreading circuit also includes a comparator configured to compare a voltage stored by the capacitor to a reference voltage. A switching circuit is configured to discharge the capacitor in response to the comparator indicating that the stored voltage exceeds the reference voltage. The switching circuit may synchronize discharge of the capacitor to an edge of the first clock signal. The output of the comparator is used as the second clock signal. Due to the variation in the generated current, which is proportional to the charge time of the capacitor, the frequency of the second clock signal exhibits pseudorandom variation.

The embodiments may be adapted to regulate current for various load circuits. However, for ease of explanation, the examples and embodiments may be primarily described with reference to regulation of current used to drive an LED circuit.

Turning now to the figures, FIG. 1 shows an example load driver circuit 100, consistent with one of more embodiments. In this example, the load driver circuit 100 includes a clock circuit 102 configured to generate a first clock signal (Clk). Frequency spectrum spreading circuit 106 is configured to spread the frequency spectrum of the first clock signal to generate a second clock signal (FSS Clk). A switching regulator 108 is configured to generate a regulated voltage (V_reg) at a supply node as a function of the second clock signal. For instance, the switching regulator 108 may switch between charging and idle modes of operation according to a duty cycle derived from FSS Clk. As previously described, due to the spread frequency spectrum of FSS Clk in comparison to Clk, switching noise exhibited by the switching regulator 108 is distributed across a wider frequency band.

The regulated voltage V_reg may power various load circuits (not shown) coupled to the load driver circuit 100. For each load circuit, current regulation circuit 116 is configured to regulate current in a path from the supply node and through the load circuit. In some implementations, the current regulation circuit 116 may include a respective current sink to regulate each respective load current by restricting current from the load circuit to a ground node. Alternatively or additionally, the current regulation circuit 116 may include a respective current source to regulate the load current by restricting current from the source node to the load circuit. In some implementations, the current regulation circuit 116 may drive current sources or current sinks used to regulate load currents using a pulse width modulated signal derived from the Clk clock signal. Alternatively or additionally, the current regulation circuit 116 may use the Clk clock signal to decode pulse width modulated control signals input to the current regulation circuit 116. As the frequency spectrum in the Clk clock signal is not spread, error is not introduced in regulation of the load currents.

Figure 2:
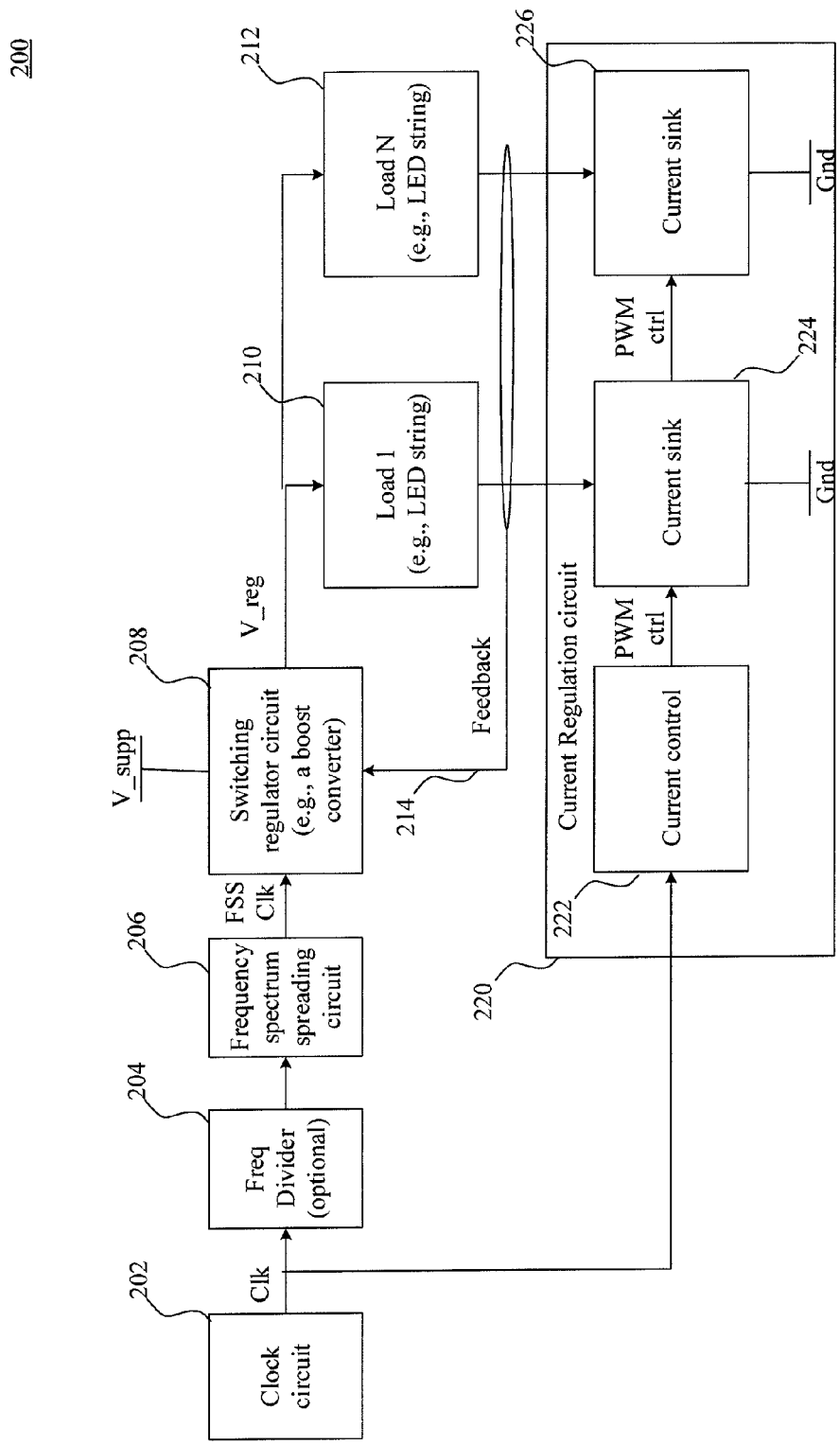
FIG. 2 shows another example load driver circuit, consistent with one of more embodiments.

FIG. 2 shows another example load driver circuit, consistent with one or more embodiments. In this example, the load driver circuit 200 includes a clock circuit 202 configured to generate a first clock signal (Clk). Frequency spectrum spreading circuit 206 is configured to spread the frequency spectrum of the Clk clock signal to generate a second clock signal (FSS Clk) having a frequency spectrum distributed across a wider frequency range than that of the Clk clock signal. Similar to the driver circuit 100, driver circuit 200 includes a switching regulator circuit 208 is configured to generate a regulated voltage at a supply node as a function of the second clock signal. As previously described, due to the frequency spectrum spreading, switching noise exhibited by the switching regulator 208 is distributed across a wider frequency band.

The regulated voltage V_reg may power various load circuits 210 and 212 coupled to the load driver circuit 200. As an example application, the load driver circuit 200 may be used to drive a number of LED strings, each having multiple LEDs connected in series. In some applications, an LED string may include a large number of LEDs. In such applications, a voltage larger than the available power supply (e.g., a battery) may be needed to provide the required voltage difference across each LED in the string. A boost converter may be used as the switching regulator circuit 208 to generate a regulated voltage (V_reg) that is greater than a supply voltage (V_supp).

When the same regulated voltage is used to drive multiple load circuits 210 and 212 unnecessary power dissipation may occur if the load circuits are not balanced. For example, in some LED strings, individual LED may be bypassed using a switch connected in parallel with the LED. If a number of LEDs are bypassed in a first string, but not a second string, the second string may exhibit a larger voltage drop in comparison to the first string. In some embodiments, the switching regulator circuit 208 is configured to monitor voltage drop of the load circuits 210 and 212 via a feedback circuit 214 and adjust the regulated voltage V_reg based on the voltage drop. For instance, the switching regulator 208 may determine one of a set of LED strings driven by the load driver 200 having the largest voltage drop. The switching regulator 208 may adjust the regulated voltage V_reg to be just high enough to drive the LED string having the highest voltage drop. In some implementations, the load driver circuit 200 may include multiple switched-mode power supplies 208, each configured to drive respective load circuits or respective groups of load circuits.

The load driver circuit 200 includes a current regulation circuit 220 configured to regulate load currents for each of the load circuits 210 and 212. In this example, the current regulation circuit 220 includes current sinks 224 and 226 to regulate load currents for respective load circuits 210 and 212. The current sinks 224 and 226 regulate load currents by restricting current from each of the load circuits 210 or 212 to a ground node. Alternatively or additionally, the current regulation circuit 220 may include a respective current source to regulate the load current by restricting current from the source node to the load circuit.

The current regulation circuit 220 also includes a current control circuit 222 configured to control the current sinks 224 and 226 and/or current sources (not shown) to regulate the load currents for the load circuits 210 and 212. In this example, the current control circuit 222 controls the current sinks 224 and 226 using a pulse width modulated signal derived from the Clk clock signal. Alternatively or additionally, the current regulation circuit 220 may use the Clk clock signal to decode control signals input to the current regulation circuit 116. As previously described, because the frequency spectrum in the Clk clock signal is not spread, error is not introduced in regulation of the load currents.

In some implementations, the load driver circuit 200 may include one or more frequency divider circuits. In this example, the load driver circuit 200 includes frequency divider circuit 204 configured to divide frequency of the Clk clock signal generated by clock circuit 202 before providing the clock signal to the frequency spectrum spreading circuit 206. As an illustrative example, the clock circuit 202 may generate a high-frequency clock (e.g., 10 MHz) used by the current control circuit 216 for sampling or generating control signals whereas the switching regulator 208 may use a lower clock frequency (e.g., 1 MHz) for operation. Similarly, the frequency of the pulse width modulated control signals generated by the current control circuit 222 may also be lower than the high-frequency clock Clk. The pulse width modulated control signals may have a frequency, for example, in a range of 5 kHz to 100 kHz.

Figure 3:
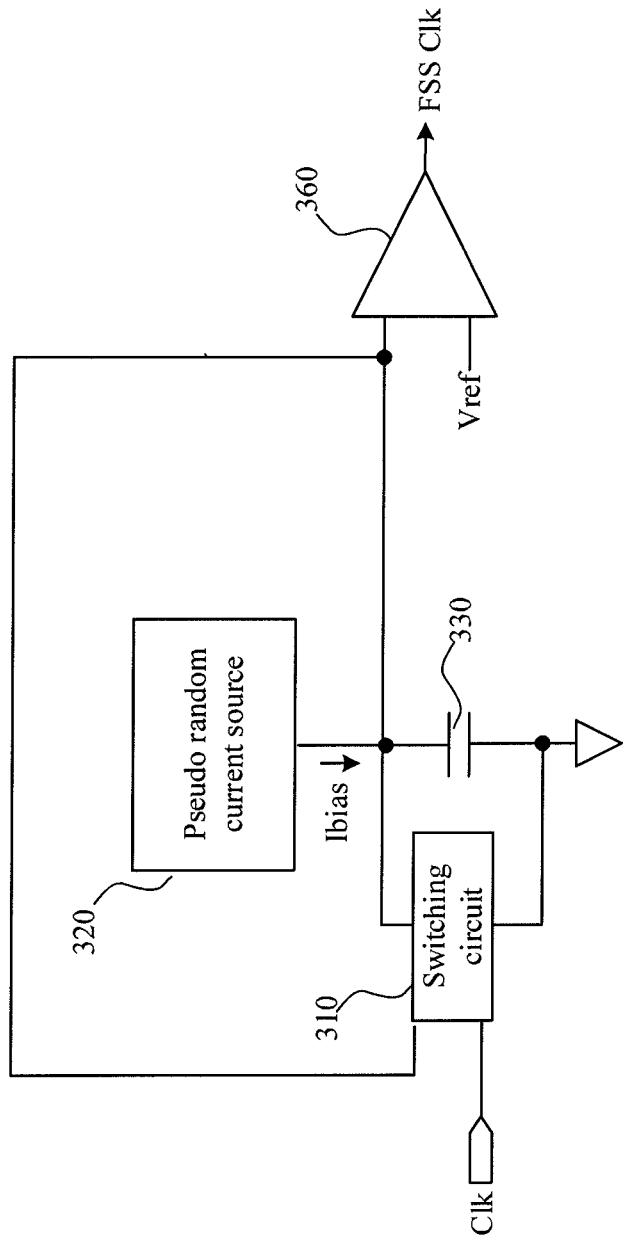
FIG. 3 shows a first example circuit for performing frequency spectrum spreading, consistent with one of more embodiments.

The above described frequency spreading circuits 106 and 206 may be implemented using various different circuits. FIG. 3 shows a first example frequency spectrum spreading circuit 300, consistent with one or more embodiments. In an example implementation, the frequency spectrum spreading circuit 300 includes a pseudorandom current source 320 configured to generate a current having pseudorandom variation and a capacitor 330 coupled to receive the generated current. The frequency spectrum spreading circuit 300 also includes a comparator circuit 360 configured to compare a voltage stored by the capacitor 330 to a reference voltage (Vref). A switching circuit 310 is configured to discharge the capacitor 330 in response to the comparator circuit 360 indicating that the stored voltage exceeds Vref. In this example, the switching circuit 310 synchronizes discharge of the capacitor 330 to an edge of the input clock signal Clk. The second clock signal FSS Clk is output by the comparator circuit 320. The comparator circuit 360 sets FSS Clk to a first value (e.g., logic 1) in a first time period in which the charge of the capacitor is less than the reference voltage charging. The comparator circuit 360 sets FSS Clk to a second value (e.g., logic 0) in a second time period in which the charge of the capacitor is greater than the reference voltage. Due to the pseudorandom variation in the current, the charging time of the capacitor in the first and second time period includes pseudorandom variation. In this manner, the frequency spectrum of FSS Clk is distributed in a wider frequency band in comparison to the frequency spectrum of Clk.

Figure 4:
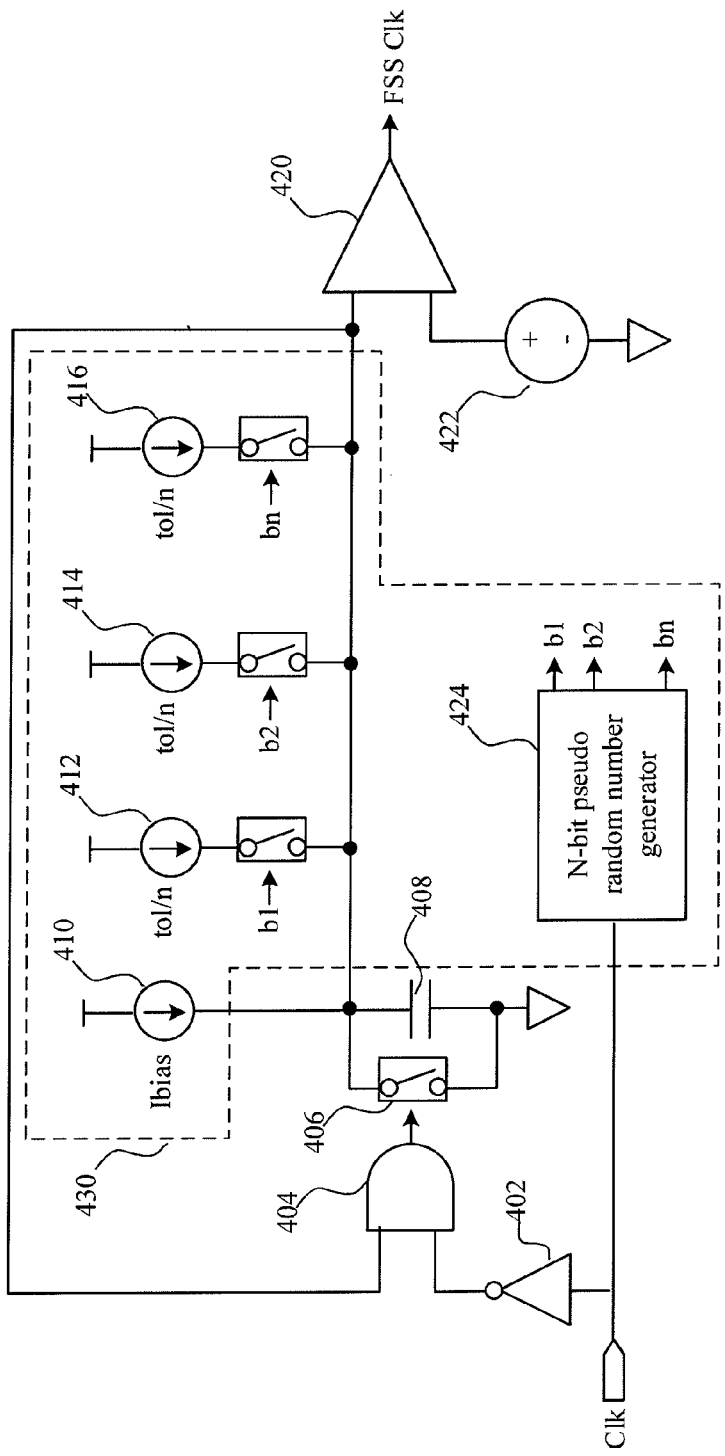

FIG. 4 shows a second example frequency spectrum spreading circuit 400, consistent with one or more embodiments. In an example implementation, the frequency spectrum spreading circuit 400 includes a current source 430 configured to generate a current having pseudorandom variation and a capacitor 408 coupled to receive the generated current. The frequency spectrum spreading circuit also includes a comparator circuit 420 configured to compare a voltage stored by the capacitor 408 to a reference voltage provided by voltage source 422. A switching circuit 402, 404, and 406 is configured to discharge the capacitor 408 in response to the comparator 420 indicating that the stored voltage exceeds the reference voltage. In this example, the switching circuit 402, 404, and 406 synchronizes discharge of the capacitor 408 to an edge of the clock signal Clk. The second clock signal FSS Clk is output by the comparator circuit 420. The comparator circuit 420 sets FSS Clk to a first value (e.g., logic 1) in a first time period in which the charge of the capacitor is less than the reference voltage charging. The comparator circuit 420 sets FSS Clk to a second value (e.g., logic 0) in a second time period in which the charge of the capacitor is greater than the reference voltage. Due to the pseudorandom variation in the current, the charging time of the capacitor in the first and second time period includes pseudorandom variation. In this manner, the frequency spectrum of FSS Clk is distributed in a wider frequency band in comparison to the frequency spectrum of Clk.

In this example, the pseudorandom current source 430 includes a primary current source 410 configured to provide a primary current (Ibias) configured to cause FSS Clk to oscillate at a target base frequency. The pseudorandom current source 430 also includes a plurality of secondary current sources 412, 414, and 416, configured to jointly add a pseudorandom secondary current to the primary current. Different applications may use various amounts of current for the primary and secondary currents. As an illustrative example, the secondary current may be pseudo-randomly set to a value in a range between 0 to 1% of the primary current. In this example, the pseudorandom current source 430 includes N secondary current sources 412, 414, and 416 each configured to provide 1/Nth of the secondary current when enabled. The pseudorandom current source 430 also includes a pseudorandom number generator 424 configured to generate an N-bit pseudorandom number. Each bit of the N-bit pseudorandom number is used to enable/disable a respective one of the secondary current sources 412, 414, and 416.

Figure 5:
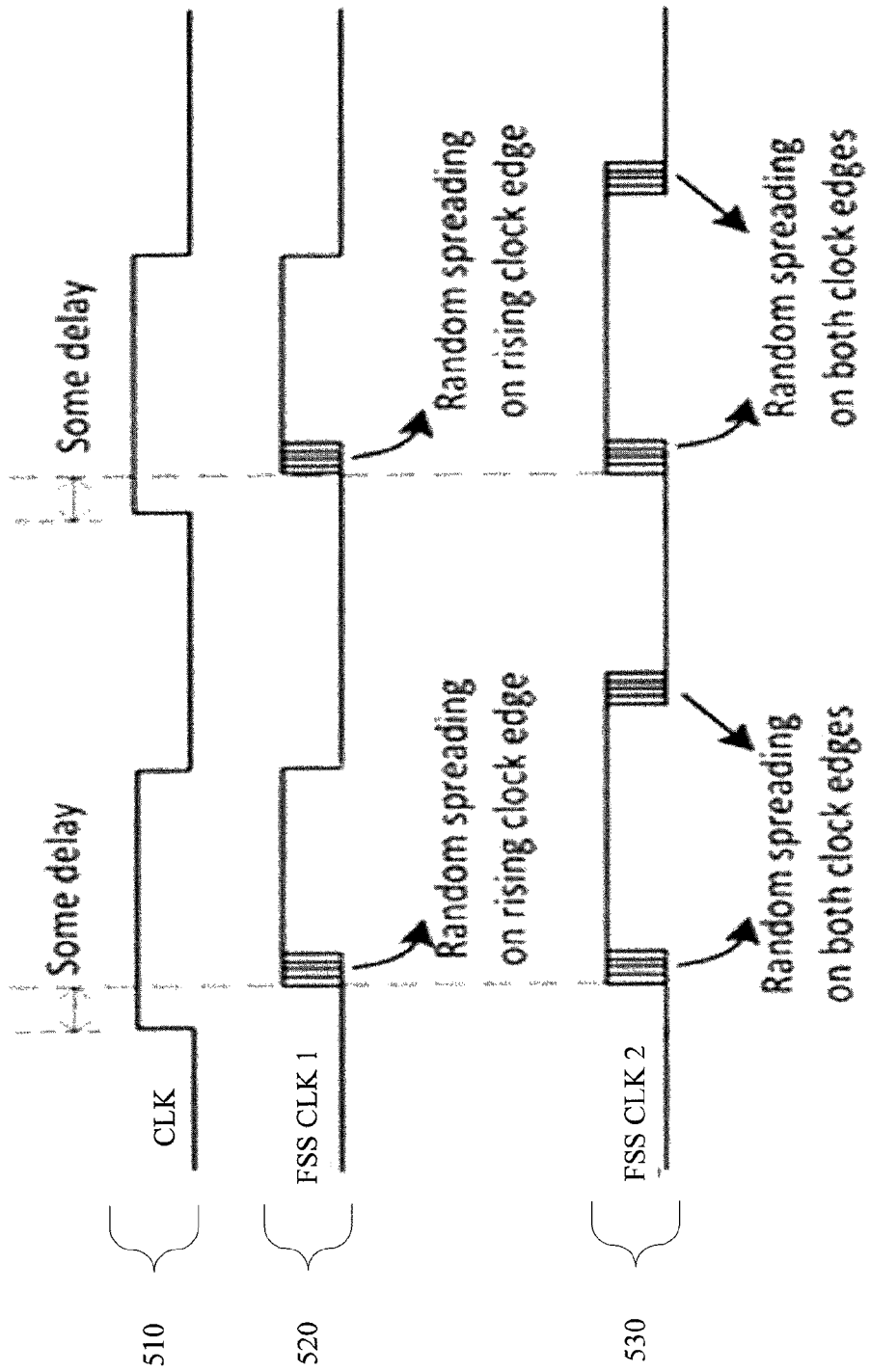
FIG. 5 illustrates frequency spectrum spreading of a clock signal waveform.

FIG. 5 illustrates frequency spectrum spreading of a clock signal. For ease of explanation, the waveforms in FIG. 5 are described with reference to the frequency spectrum spreading circuit 400 shown in FIG. 4. Waveform 510 shows an original clock signal (Clk), for example, input to the frequency spectrum spreading circuit 400. Waveform 520 shows the FSS Clk signal output by comparator 420. As shown in FIG. 5, the waveform 520 is initially set low when charge on the capacitor is less than the reference voltage. The waveform 520 becomes set high when charge on the capacitor reaches the reference voltage. As previously discussed, location of the low-to-high transition varies due to the pseudorandom current used to charge the capacitor 408. In this example, the switching circuit 402, 404, and 406 is configured to discharge the capacitor in response to waveform 520 (FSS Clk) being set high and waveform 510 (Clk) being set low. As a result, the high-to-low transition of waveform 520 is aligned with the high-to-low transition of waveform 510. In some implementations, a frequency spectrum spreading circuit may be configured to implement random spreading of the high-to-low transition in addition to, or in lieu of, the low-to-high transition. For example, waveform 530 shows an example clock signal with frequency spectrum spreading of both low-to-high and high-to-low transitions.

Figure 6:
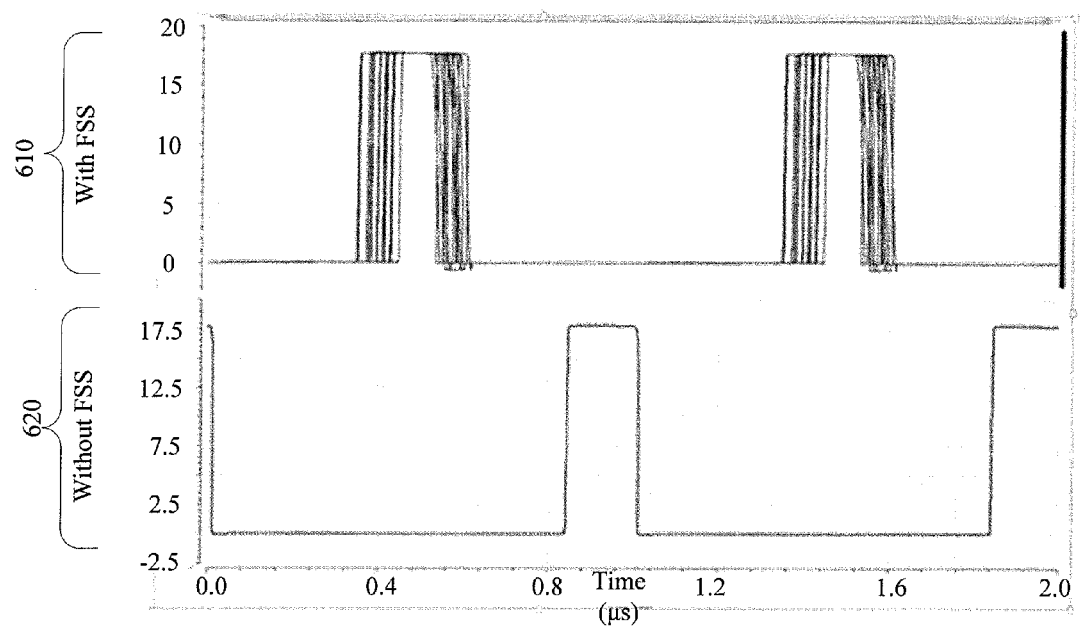
FIG. 6 shows example time-domain waveforms of a pulsed signal with and without frequency spectrum spreading.

FIG. 6 shows example time-domain waveforms of a pulsed signal with and without frequency spectrum spreading. Waveform 620 shows a pulsed waveform without frequency spectrum spreading. Waveform 610 shows a pulsed waveform with frequency spectrum spreading. In this example, leading edges are randomly shifted earlier or later in time to introduce slight variation in the frequency spectrum of the signal.

Figure 7:
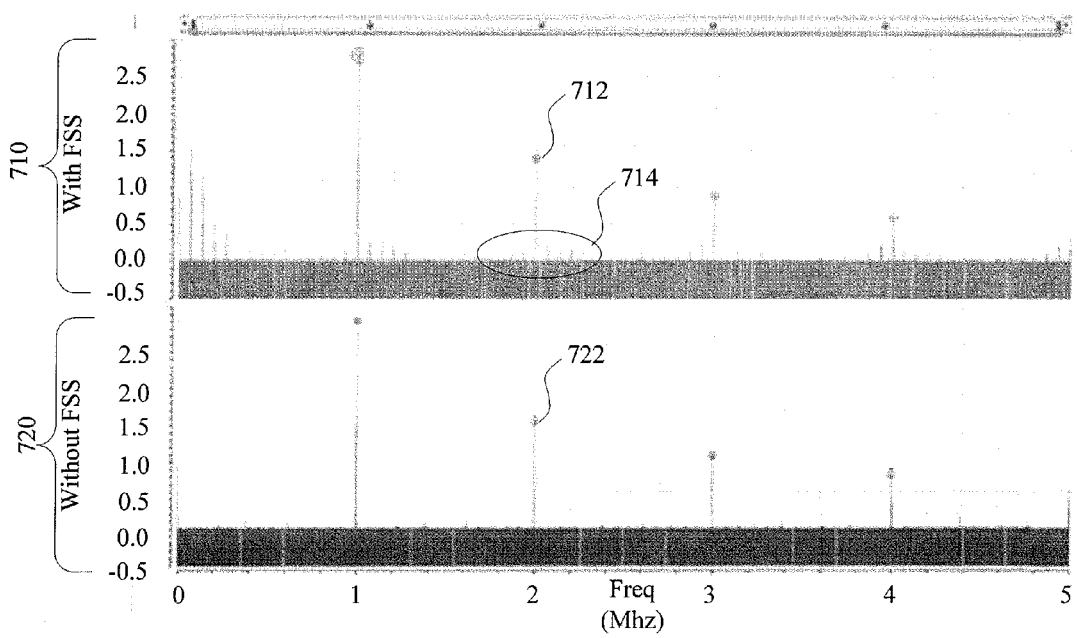
FIG. 7 shows example frequency-domain waveforms of a pulsed signal with and without frequency spectrum spreading.

FIG. 7 shows example frequency-domain waveforms of a pulsed waveforms shown in FIG. 6. Waveform 720 shows the frequency spectrum of the pulse signal waveform 520. As shown in waveform 720, the pulsed waveform exhibits large spikes (e.g., 722) in narrow frequency bands corresponding to the frequency of the pulsed waveform and harmonic frequencies thereof. Waveform 710 shows the frequency spectrum of the waveform 610 with frequency spectrum spreading. As shown in waveform 710, frequency spectrum spreading causes spike 712 to be reduced in comparison to spike 722 by shifting a portion of the frequency component to adjacent frequencies 714.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., clock generation, frequency spectrum spreading, voltage regulation, and/or current regulation). For example, in certain of the above-discussed embodiments, one or more modules are discrete logic circuits or programmable logic circuits configured and arranged for implementing these operations/activities, as in the circuit modules shown in FIGS. 1, 2, and 3. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions. Certain embodiments are directed to a computer program product (e.g., nonvolatile memory device), which includes a machine or computer-readable medium having stored thereon instructions which may be executed by a computer, system-on-chip, programmable IC, or other electronic device to perform these operations/activities.

Based upon the above discussion and illustrations, those skilled in the art will readily recognize that various modifications and changes may be made to the various embodiments without strictly following the exemplary embodiments and applications illustrated and described herein. For instance, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the invention, including aspects set forth in the claims.

What is claimed is:

1. An apparatus comprising:
   a first circuit configured and arranged to generate a first clock signal with a frequency spectrum having a first frequency range;
   a second circuit coupled to the first circuit and configured and arranged to generate a second clock signal from the first clock signal by spreading the frequency spectrum of the first clock to have a second frequency range that is wider than the first frequency range;
   a third circuit configured and arranged to provide a regulated voltage at a supply node by coupling a power source to the supply node in a first mode of operation, uncoupling the power source from the supply node in a second mode of operation, and
   switching between the first and second modes of operation at a plurality of frequencies derived from the frequency spectrum of the second clock signal; and a fourth circuit configured and arranged to regulate current in a circuit path, from the supply node and passing through a load circuit coupled to the current regulator, according to the first clock signal.

2. The apparatus of claim 1, wherein the second circuit includes
a current source configured and arranged to provide a current having pseudorandom variation
a capacitor configured and arranged to receive the current from the current source,
a comparator configured and arranged to compare a voltage stored by the capacitor to a reference voltage; and
a switching circuit configured and arranged to discharge the capacitor in response to the comparator indicating that the stored voltage exceeds the reference voltage.

3. The apparatus of claim 2, wherein the current source includes
a pseudorandom noise generator configured and arranged to generate an M-bit pseudorandom number;
a first current source configured and arranged to provide a constant current to the capacitor; and
M current sources, each coupled to receive a respective bit of the M-bit pseudorandom number and configured and arranged to provide a respective current to the capacitor in response to the respective bit having a first value.

4. The apparatus of claim 2, wherein the switching circuit is configured and arranged to synchronize discharging of the capacitor, in response to the comparator indicating that the stored voltage exceeds the reference voltage, with an edge of the first clock signal.

5. The apparatus of claim 2, wherein the second circuit is configured and arranged to provide a signal output by the comparator as the second clock signal.

6. The apparatus of claim 1, wherein the third circuit includes a boost converter.

7. The apparatus of claim 1, wherein the fourth circuit includes
a pulse generation circuit configured and arranged to generate a pulsed signal as a function of the first clock signal; and
a pulse controlled current source configured and arranged to regulate the current in the circuit path according to the pulsed signal.

8. The apparatus of claim 7, wherein the fourth circuit further includes a second pulse controlled current source configured and arranged to regulate current in a second circuit path, from the supply node and passing through a second load circuit coupled to the fourth circuit, according to the pulsed signal.

9. The apparatus of claim 8, wherein the pulse generation circuit is configured and arranged to adjust currents in the respective circuit paths by adjusting a duty cycle of the pulsed signal.

10. The apparatus of claim 1, further comprising the load circuit; and wherein the load circuit includes a plurality of light emitting diodes coupled in series along the circuit path through the load circuit.

11. A method, comprising:
generating a first clock signal with a frequency spectrum having a first frequency range;
generating a second clock signal by spreading frequency spectrum of the first clock signal to have a second frequency range that is wider than the first frequency range;
providing a regulated voltage at a supply node as a function of the second clock signal; and
regulating current in a circuit path, from the supply node and passing through a load circuit, as a function of the first clock signal.

12. The method of claim 11, wherein the spreading of the frequency spectrum of the first clock signal includes
generating a current having pseudorandom variation;
charging a capacitor by providing the current to the capacitor;
comparing a voltage stored by the capacitor to a reference voltage; and
discharging the capacitor in response to the voltage stored by the capacitor exceeding the reference voltage.

13. The method of claim 12, further comprising dividing the first clock signal to produce an intermediary clock signal.

14. The method of claim 13, further comprising synchronizing the discharging of the capacitor to an edge of the first clock signal.

15. The method of claim 12, further comprising:
setting the second clock signal to a first value in response to the voltage stored by the capacitor exceeding the reference voltage; and
setting the second clock signal to a second value in response to the reference voltage exceeding the voltage stored by the capacitor.

16. The method of claim 11, wherein the generating of the current having pseudorandom variation includes:
generating an M-bit pseudorandom number; and
for each bit of the M-bit pseudorandom number, enabling a respective current source in response to the bit being set to a first value and disabling the respective current source in response to the bit being set to a second value.

17. The method of claim 11, wherein the generating of the current is performed using a boost converter clocked by the second clock signal.

18. The method of claim 11, wherein the regulating of current in the circuit path includes
generating a pulse width modulated waveform from the first clock signal; and
providing the pulse width modulated waveform to a pulse width controlled current source.

19. The method of claim 18, further comprising
wherein the regulating of current in the circuit path includes
generating a pulse width modulated waveform from the first clock signal; and
providing the pulse width modulated waveform to a pulse width controlled current source.

20. The method of claim 11, further comprising regulating current in a second circuit path, from the supply node and passing through a second load circuit, as a function of the first clock signal.

* * * * *